(12) United States Patent
Cesulka

(10) Patent No.: US 6,456,240 B1
(45) Date of Patent: Sep. 24, 2002

(54) HIGH-G, LOW ENERGY BEACON SYSTEM

(75) Inventor: John L. Cesulka, Ft. Walton Beach, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/832,439

(22) Filed: Apr. 12, 2001

(51) Int. Cl.[7] .............................. G01S 3/02; G01S 1/02
(52) U.S. Cl. .................. 342/463; 342/385; 342/417; 342/419; 342/450; 257/678; 257/701; 361/600; 361/679; 361/820; 244/3.1
(58) Field of Search ..................... 244/3.1; 342/27, 342/28, 42, 43–51, 175, 195, 385, 386, 417–453, 107, 365, 387, 463, 464, 465; 361/600, 679, 683–804, 820; 324/754; 257/713, 685, 686, 701–712, 678

(56) References Cited

U.S. PATENT DOCUMENTS

| 3,706,096 A | * 12/1972 | Hammack .................. 342/107 |
| 3,935,817 A | 2/1976 | Riparbelli |
| 3,995,273 A | * 11/1976 | Ulstad ........................ 342/463 |
| 3,996,590 A | * 12/1976 | Hammack ................... 342/465 |
| 4,281,809 A | 8/1981 | Oglesby et al. |
| 4,365,195 A | * 12/1982 | Stegens ....................... 324/754 |
| 4,448,106 A | 5/1984 | Knapp |
| 4,679,748 A | 7/1987 | Blomqvist et al. |
| 5,064,151 A | 11/1991 | Cerimele et al. |
| 5,175,613 A | * 12/1992 | Barker, III et al. ......... 257/713 |
| 5,589,838 A | * 12/1996 | McEwan ..................... 342/387 |
| 5,790,076 A | * 8/1998 | Sypniewski ................. 342/365 |
| 6,310,773 B1 | * 10/2001 | Yusuf et al. ................ 361/704 |

* cited by examiner

Primary Examiner—Bernarr E. Gregory
(74) Attorney, Agent, or Firm—Gerald B. Hollins; Thomas L. Kundert

(57) ABSTRACT

A switch modulated low duty cycle low energy mass limited radio frequency beacon system for locating spent, un-exploded or experimental munitions projectiles in a large open-air test range or within a dirt backstop. The disclosed locator beacon is mounted on a rear portion of a projectile before launch and includes a protective (and antenna length-shortening) resin dielectric material housing in which locator beacon circuit components are contained and immunized against high G forces by a combination of component supporting, energy deflecting and energy absorbing protective arrangements.

20 Claims, 6 Drawing Sheets

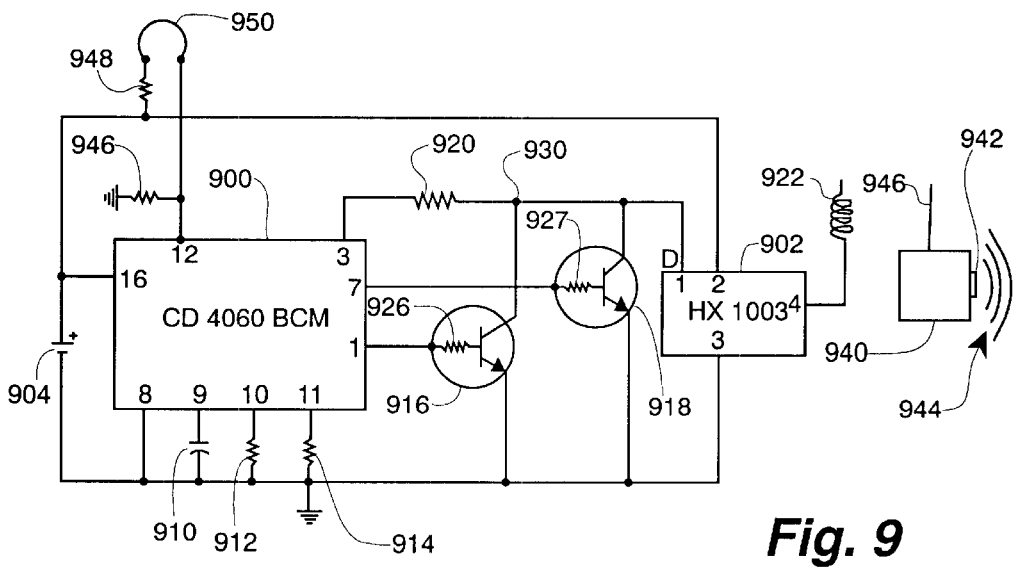
Fig. 9
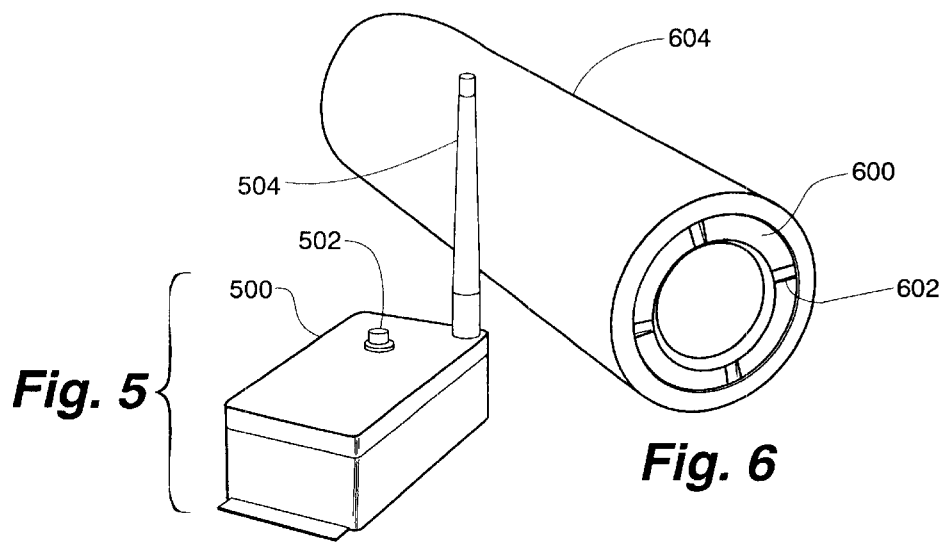
Fig. 5
Fig. 6

Forward

HIGH-G, LOW ENERGY BEACON SYSTEM

CROSS REFERENCE TO RELATED APPLICATIONS

The present application is somewhat related to the U.S. patent application Ser. No. 09/832,453 now U.S. Pat. No. 6,380,906 and Ser. No. 09/832,454, but filed on Apr. 12, 2001. The contents of these somewhat related applications are hereby incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

In the development of military munitions devices it is often desirable to retrieve a test projectile or spent munitions device from its location of finally coming to rest (whether above ground or buried). Such removal serves the purposes of projectile (or warhead) study and improvement and also serves a test range cleanup function of removing the hazard such devices present to persons and equipment and future testing conducted in the same area of a testing range if not removed. In the testing of military hardened target-compatible munitions it is often desirable for example to study the integrity of the penetrator portion of a projectile or study the experimental content of a projectile for target impact-incurred damage and for penetrator integrity-improvement purposes. Such information is desirable in the case of both air launched munitions devices such as bombs and cannon shells and for artillery launched munitions including howitzer projectiles and naval munitions. The thus-acquired information supports development of new materials and structures.

FIG. 4 in the drawings herein shows a test of this type involving a typical reinforced concrete target 401. The FIG. 4 target 401 has been penetrated by a 4-inch diameter projectile in an event producing target concrete spalling and exposure of reinforcing bars. The usual recovery method for a projectile involved in the FIG. 4 scene is to visually sift through front-end loader bucket volumes of soil from the backstop mound 410 as the soil is slowly dumped from an elevated position. Since the projectile trajectory in the backstop soil is unstable and random, projectile turns are common, and one must frequently examine numerous front-end loader bucket volumes and empty the loader slowly, often searching for hours before locating the projectile. Furthermore, such visual searching may fail if the projectile is hidden by a concurrently falling quantity of soil or by other real world effects.

In FIG. 4 however there is represented an actual photo of a buried projectile recovery that was accomplished in accordance with the present invention. The location accomplished in this present invention manner is sufficiently accurate to enable projectile recovery in minutes of time and by the FIG. 4 illustrated manual shoveling. As described below herein such present invention projectile location is accomplished through use of a UHF signal radiating through the ground from the usually buried test projectile. In addition to the FIG. 4 focused-area recovery, projectiles to be located may also penetrate both the target 401 and the backstop earth 410 and may also glance off the backstop earth to (with the present invention) result in an open field projectile and beacon hunt, usually involving many personnel searching through tall grass (in the case of a Florida or other open test range). A surviving beaconaccording to the present invention, whether buried or not, cuts the time and personnel required for recovery of the projectile regardless of its resting point and whether the projectile is carrying an experiment or other recoverable cargo. Larger munitions launched from aircraft for example are subject to these same difficulties and may use the system described herein for similar recovery efforts. Electronics including an amplifier appropriate to the increased range of these larger devices, and a larger antenna scaled to fit may be desired in these instances.

Although these discussions are premised on the usual case of recovering test or dud munitions devices the same difficulties exist with obvious compounding in the exceptional cases of needing to locate and remove a live munitions test device that has failed to detonate. Although such instances are rare and avoided through use of great care, Murphy's Law, the rules of statistical sampling and similar real world algorithms assure their occasional occurrence. In such exceptional instances the need for precise spent projectile location is, if anything, even greater and additional complexities such as time delay considerations and the need to use protective measures during the search are present.

Electronic locator devices intended to fill these needs may be understood to involve several special requirements not of concern in most electronic circuit uses. Perhaps the most difficult of these requirements is a tolerance for the deceleration forces experienced by a projectile or other penetrator device such as for example a bomb. Additional considerations include a locator device operating life measuring in at least tens of hours and preferably in a plural number of days—until retrieval is safe and convenient. In addition small physical size and mass, moisture immunity and temperature immunity over at least moderate ranges are also significant needs. Often as in the case of the below-disclosed preferred embodiment of the invention these requirements become substantially intertwined so that for example an increase in operating life is possible at the expense of unacceptable increased battery size and mass and impact deceleration vulnerability. In the latter instance for example a larger locator beacon battery is more susceptible to deceleration damage and can be damaged by its own inertia in spite of a surviving protective encasement. This relationship alone is a significant factor in seeking to minimize beacon mass and energy requirements and is the prompter for one special aspect of the present invention.

Locator devices need not however be of the operating power level, detailed information providing and continuous performance nature required in the above two identified and incorporated by reference herein munitions penetration sequence data retrieval devices and their patent documents. The present beacon can instead be of a lower power, simplified signal form and of a more economical arrangement as is disclosed herein. With respect to impact tolerance the beacon of the present invention must of course survive the deceleration forces incurred when the host warhead strikes the earth or other object however it need not function during the interval of warhead deceleration. An additional notable difference between the present invention and those of the above identified and incorporated by reference copending patent documents involves the desire for smaller antenna sizes for projectile use and the resulting selection of a higher operating frequency for the present invention and of course the needed longer duration of an operating period (in contrast with an operating period measured only in milliseconds in the copending documents invention) once operation is commenced in the case of the present beacon invention.

SUMMARY OF THE INVENTION

The present invention provides an impact resistant low cost radio frequency beacon apparatus usable over a relatively long operating life, for locating and recovering a deployed munitions device at a test range or other site. The invention is of course not limited to test range use and may be employed in numerous other need-to-locate applications in both military and non-military environments.

It is an object of the present invention therefore to provide a munitions locator beacon.

It is another object of the invention to provide a munitions locator beacon capable of operating in the environment experienced by a munitions warhead device.

It is another object of the invention to provide a munitions locator beacon capable of operating without spatial interference to the contents of its host projectile.

It is another object of the invention to provide a munitions locator beacon capable of operating within the impact deceleration, size, weight, burial and operating life constraints of a munitions projectile in a test range environment.

It is another object of the invention to provide a launching and impact deceleration-protection arrangement for the small electronics package of a munitions locator beacon apparatus.

It is another object of the invention to provide an energy conserving modulation arrangement for the output signal of a munitions device locator beacon.

It is another object of the invention to provide a munitions device locator beacon having a multiple aspect (including multiple frequency component) impact shock protection arrangement.

It is another object of the invention to provide a munitions device locator beacon which can predictably withstand the extreme impact shock forces encountered in penetrating two foot reinforced concrete targets at 1234 feet per second when attached to the tail of a 54 pound munitions projectile.

It is another object of the invention to provide a munitions device locator beacon capable of transmitting through clay-sand over distances of up to 36 feet in order to promotes rapid location and efficient recovery of spent munitions projectiles.

These and other objects of the invention will become apparent as the description of the representative embodiments proceeds.

These and other objects of the invention are provided by spent test-munitions projectile retrieval, high G force resistant low energy requirement locator beacon apparatus comprising the combination of:

a selectively configured elastic resin material housing disposable in a rear location of said test-munitions projectile prior to projectile airborne launch;

an integrated circuit chip assembly received in said selectively configured material housing and having a radio frequency energy generating integrated circuit module with an insulating material layer and an overlying selectively energy absorbing and reflecting metallic layer covering attached elastic resin one face thereof;

said integrated circuit assembly further including a radio frequency energy generating chip and a keying modulator circuit of selected distinctive audio frequency keying pattern and less than twenty-five percent radio frequency energy generating integrated circuit chip output duty cycle characteristics;

a source of electrical energy of said duty cycle and selected audio frequency keying pattern-enabling limited size and mass connected with said keying modulator circuit and said radio frequency energy generating chip;

a tubular enclosure member surrounding said integrated circuit assembly and disposed within said elastic resin material housing along one axis thereof;

a radio frequency antenna member disposed within an axial extremity portion of said organic material housing and connected with a radio frequency energy output port of said integrated circuit assembly;

a portable radio frequency energy receiver, hand cartable to a selected search vicinity location for said spent test-munitions projectile.

BRIEF DESCRIPTION OF THE DRAWING

The accompanying drawings incorporated in and forming a part of the specification, illustrates several aspects of the present invention and together with the description serve to explain the principles of the invention. In the drawings:

FIG. 5 shows the physical appearance of a radio frequency receiver usable in the present invention.

FIG. 6 shows the projectile of FIG. 2 and FIG. 4 after dig-out.

FIG. 9 shows an electrical schematic diagram relating to the present invention.

DETAILED DESCRIPTION OF THE INVENTION

Figure 1:
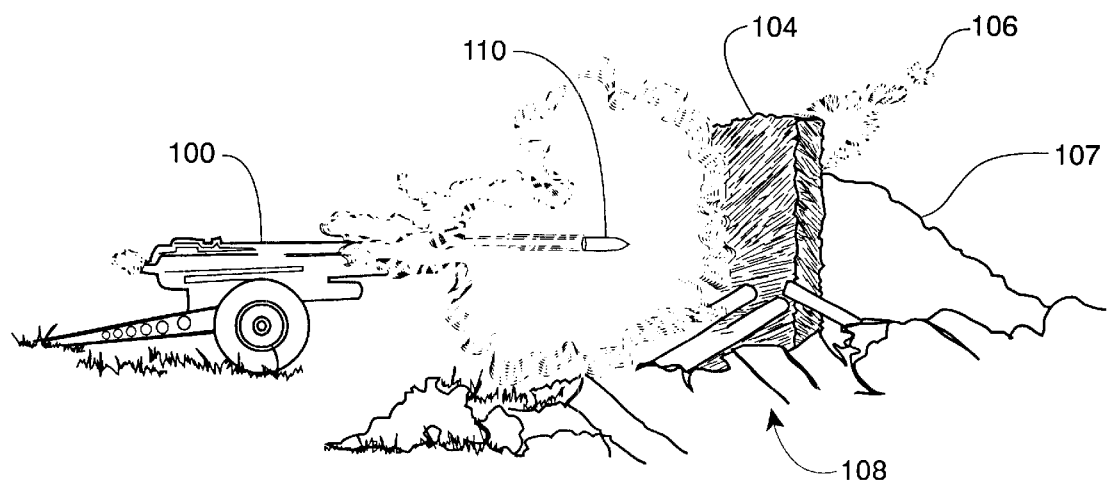
FIG. 1 shows a munitions test arrangement wherein the present invention may be used to advantage.

The present invention high G, low energy beacon system may be used to advantage in a hardened target munitions or other munitions test arrangement such as is shown in the FIG. 1 drawing. In the FIG. 1 test arrangement a cannon or howitzer 100, such as the 105-millimeter weapon used by the U.S. military, is aimed at close range at a test target 104, a target backed by a mound of earth 107 useful in arresting a firedprojectile or penetrator warhead following its expected traversing of the test target 104. Tests such as that represented in FIG. 1 are useful in shock testing fuze and electronic components housed within the penetrators. In practice it is found practical to fabricate targets such as the test target 104 from cured reinforced 5ksi concrete of for example two feet thickness; actual thickness dimensions several times this dimension are often used for real target protection however.

The buttressing indicated at 108 in FIG. 1 is used to keep the target 104 in the illustrated vertical condition notwithstanding the large impact force and ringing vibration energization it receives from the test projectile 110. An indication of the energy levels encountered during a test of the FIG. 1 type occurs in the form of the stray particle 106 appearing to depart the FIG. 1 scene at an oblique angle. Such particles may originate in the target 104 or alternately may comprise a part of, or the entirety of, the projectile launched from the howitzer 100 after it has been deflected from an original course by the target or by a subterranean object for example. Providing location assistance for integral test projectiles incurring such unexpected and largely unpredictable deflections is in fact one of the benefits of the present invention locator beacon.

In penetrating the test target 104 a 105-millimeter (about 4 inches) projectile often undergoes impact forces having a peak value measuring in the realm of eighteen to twenty two thousand times the force of gravity (i.e., 18,000 to 22,000 G's). It may be helpful in understanding the present invention to realize that in the presence of decelerations of this magnitude a small object, such as a first class postal letter, usually weighing about one ounce, would have a weight near three hundred pounds (from the F=MA relationship) when exposed to such acceleration or deceleration. Moreover the forces attending this projectile deceleration are forces comprised of numerous Fourier series components, components resembling the all-frequency mechanical spectrum descriptive of a mathematical impulse function. These frequency components range from very low frequency sinusoids to sinusoids of frequencies above the audio range and even higher. Frequencies of this wide range are found to require special consideration when making the locator beacon apparatus of the present invention tolerant to impact force decelerations as is described below herein.

Figure 2:
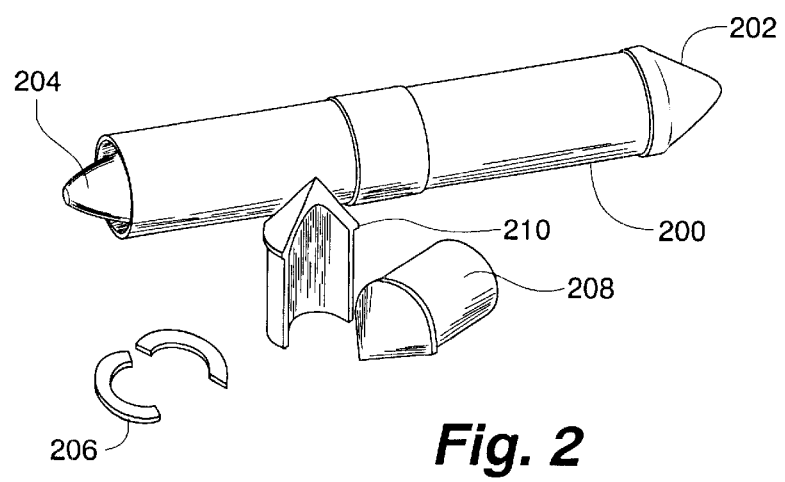
FIG. 2 shows a projectile of the penetrator device type having a present invention locator beacon attached along with sabot parts used to propel the projectile without producing hot gas damage.

The projectile used in a test of the FIG. 1 type may have a general appearance as shown in FIG. 2 of the drawings when provided with a rearward facing locator beacon according the present invention. In FIG. 2 therefore there is shown a penetrator projectile 200 of the type usable with a cannon or howitzer-launching apparatus of either the airborne or ground-based type. The projectile 200 includes a forward-located penetrator warhead 202, which may be made of hardened material such as steel. This penetrator is followed by a main charge region containing, in the case of a real weapon, a detonatable charge of explosive material and a timer or altimeter or other arrangement for initiating the rapid burning detonation of this charge. A locator beacon 204 according to the present invention is preferably disposed in a rearmost portion of the penetrator 200. The penetrator 200 may be of any desired size with the approximately four inches diameter of a 105-millimeter warhead being typical.

At 208 and 210 in the FIG. 2 drawing there is shown the two halves of a sabot device usable to isolate the penetrator 200, and especially rearward portions of the penetrator where the present invention locator beacon resides, from the hot gasses of the burning projectile propellant charge. The sabot includes internal passageways admitting small quantities of these hot gasses in order to remove the sabot from its firing position surrounding the penetrator rear area immediately after the projectile has departed a launch barrel. A threaded annular ring, used to retain the beacon by its housing flange, and including four radially directed retainer notches is shown in segments at 206 in FIG. 2 and is also visible at 600 in the FIG. 6 drawing herein. Preferably the male threads of this annular ring (not shown) engage mating female threads located in the rearward internal region of the projectile 200 to provide a secure captive retention of the locator beacon by its housing flange area. The radial notches in this annular ring permit its engagement by a tightening tool during penetrator assembly. A test payload and G data recorder is of course substituted for the main charge in the penetrator 200 during most uses of the present invention locator beacon.

Figure 3:
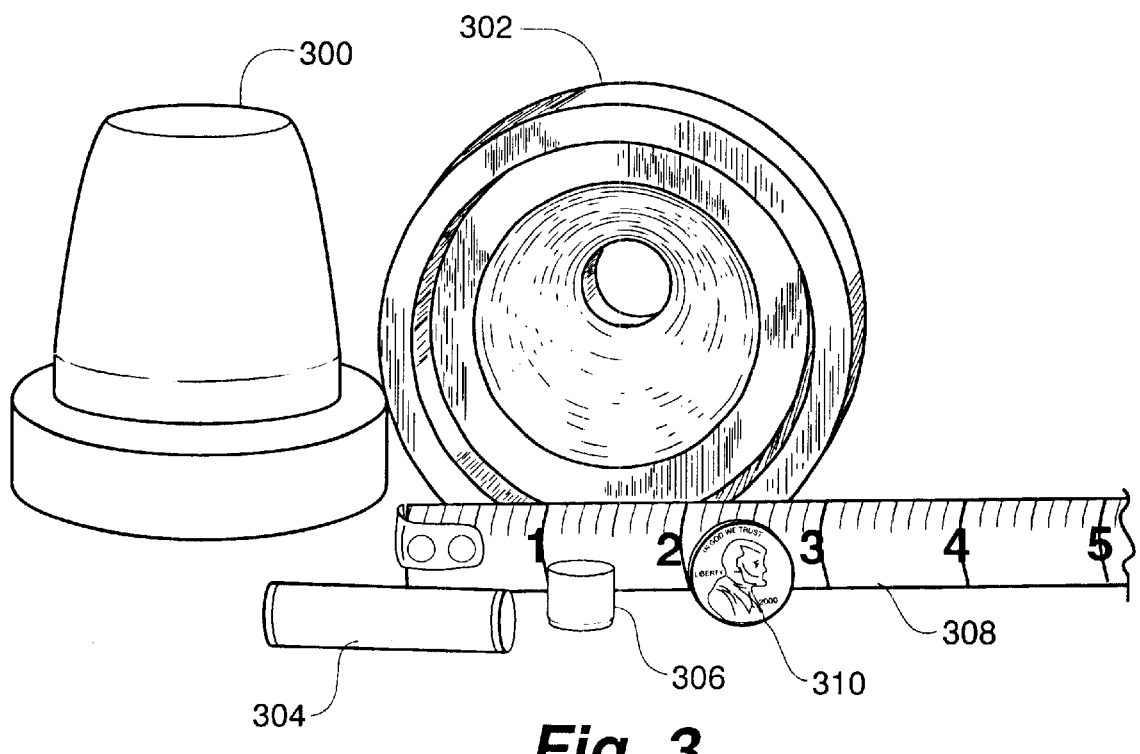
FIG. 3 shows an elastic resin housing for a locator beacon of the present invention type, two battery types receivable in the housing and a mold for fabricating the housing.

FIG. 3 in the drawings shows several physical aspects of the present invention in an environment permitting general size assessments. Included in FIG. 3 is a completed molded housing 300 for the locator beacon and a pouring mold 302 in which this housing may be fabricated. Also appearing in FIG. 3, are a measurement ruler 308 and a U.S. penny coin 310 by which relative sizes of the molded housing and pouring mold parts may be quickly appreciated. In FIG. 3 there also appears at 304 an alkaline battery cell used in some arrangements of the invention. At 306 in FIG. 3 is a DL 1/3N Duracell® lithium battery also usable in some arrangements of the invention, the arrangements for example shown in FIG. 7 and FIG. 8 herein. A material found to be suitable for the molded housing 300 is identified in the above incorporated by reference herein patent document, Ser. No. 09/832,453, i.e., a heat curable polyurethane resin of the one component or Monothane® type, a polyals material identified as the type D 65 Casting System manufactured by Synair Corporation of PO Box 5269, Chattanooga, Tenn., 37406-0269, USA (telephone 1-800-251-7642, internet: www.synair.com).

The D 65 casting system provides a heat cured elastic urethane resin of hardness 65 on the Durometer Shore hardness D scale (a relatively hard non metallic material) after pouring at a dry heated temperature between 130 and 158 degrees Fahrenheit and oven curing at an optimum temperature of 275 degrees Fahrenheit. During cure the D 65 material passes through a water-thin phase allowing entrapped air bubble escape from the mold 302. The D 65 material is described in a Synair Corporation Monothane® product bulletin also identifying other softer materials. Persons skilled in the electrical, resin materials and casting systems arts can substitute other materials, including dual component materials from the same or other sources, for the D 65 material. The pouring mold 302 in FIG. 3 may be machined from aluminum or other metals or alternately may be fabricated from resin materials as is disclosed in the above referenced Synair literature. The shape of the housing 300 is selected to provide desirable physical strength for the housing structure, electrical isolation of the beacon antenna from attenuating and antenna effective length-altering moisture and other earth components and a desirable extension of the electrical length of the beacon antenna all in the manner also described in the above incorporated by reference herein Ser. No. 09/832,453, filed Apr. 12, 2001, now U.S. Pat. No. 6,380,906. Said shape is intentionally tapered to reduce the housing exposure area when tumbling across soil down range of a test-firing event. Square like ends for housing 300 have in fact broken off during testing.

Figures 7, 7A:
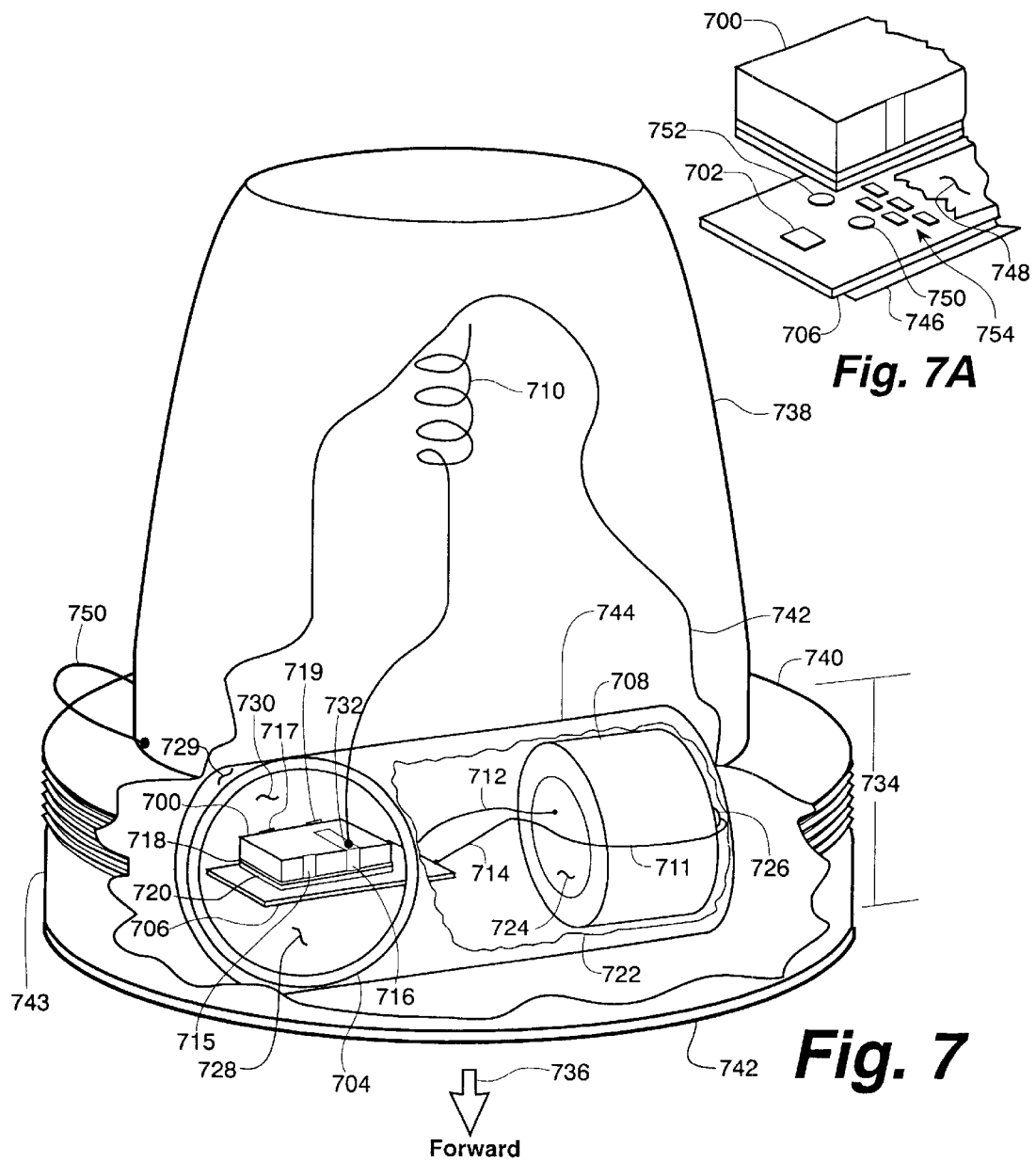
FIG. 7 shows an expanded view of one arrangement for mounting electrical components according to the present invention.
FIG. 7A shows an expanded or blow-up view of parts of FIG. 7.
Figure 8:
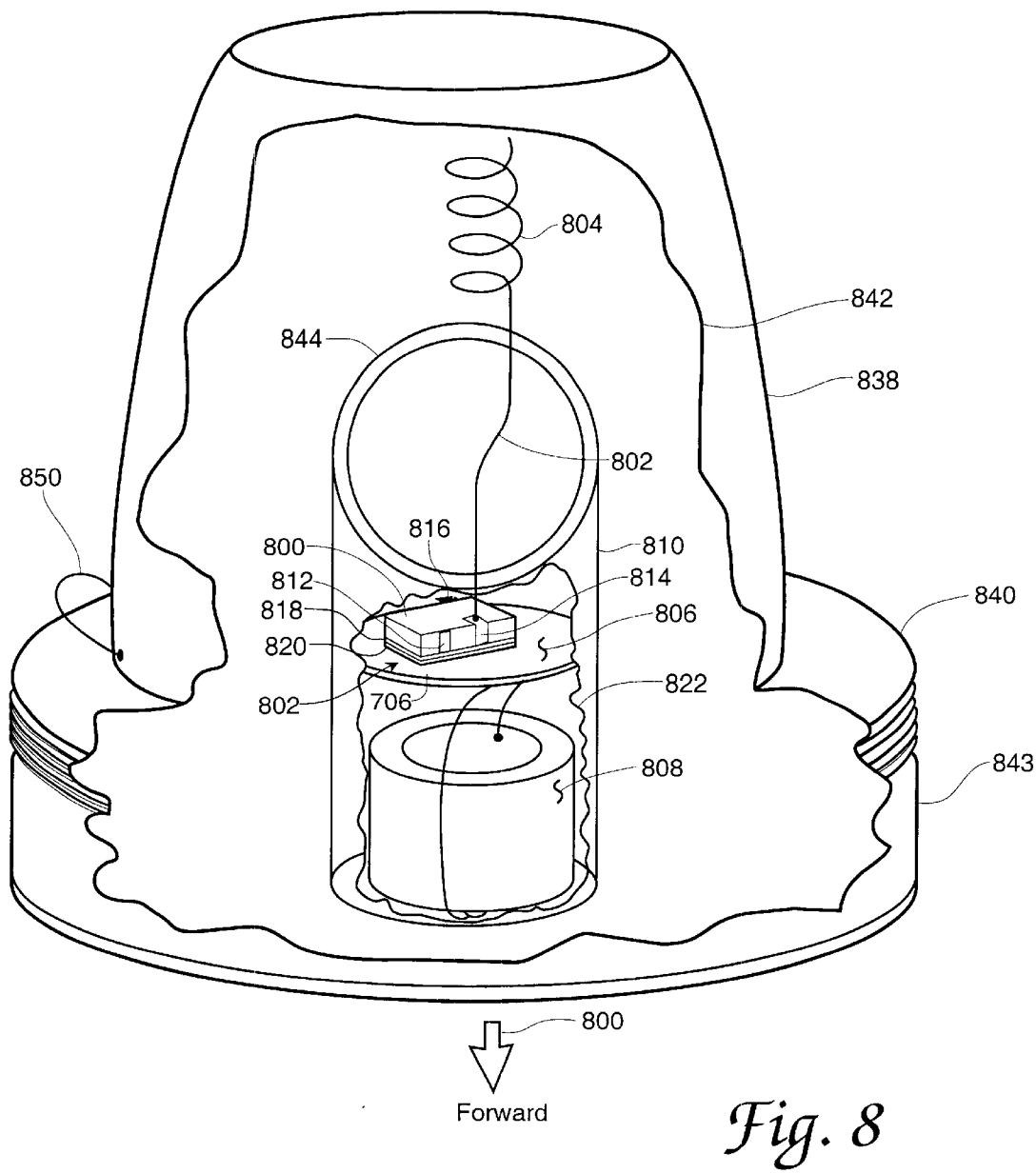
FIG. 8 shows an expanded view of another arrangement for mounting electrical components according to the present invention.

As disclosed in connection with drawings of FIG. 7 and FIG. 8 herein a fiberglass-reinforced tube as shown at 744 and 844 in these drawings may alternately be disposed in either a horizontal or a vertical orientation with respect to the molded housing 300 in order to provide physical protection for the beacon electrical circuitry. The housing 300 appears at 738 and 838 in the FIG. 7 and FIG. 8 drawings.

Figure 4:
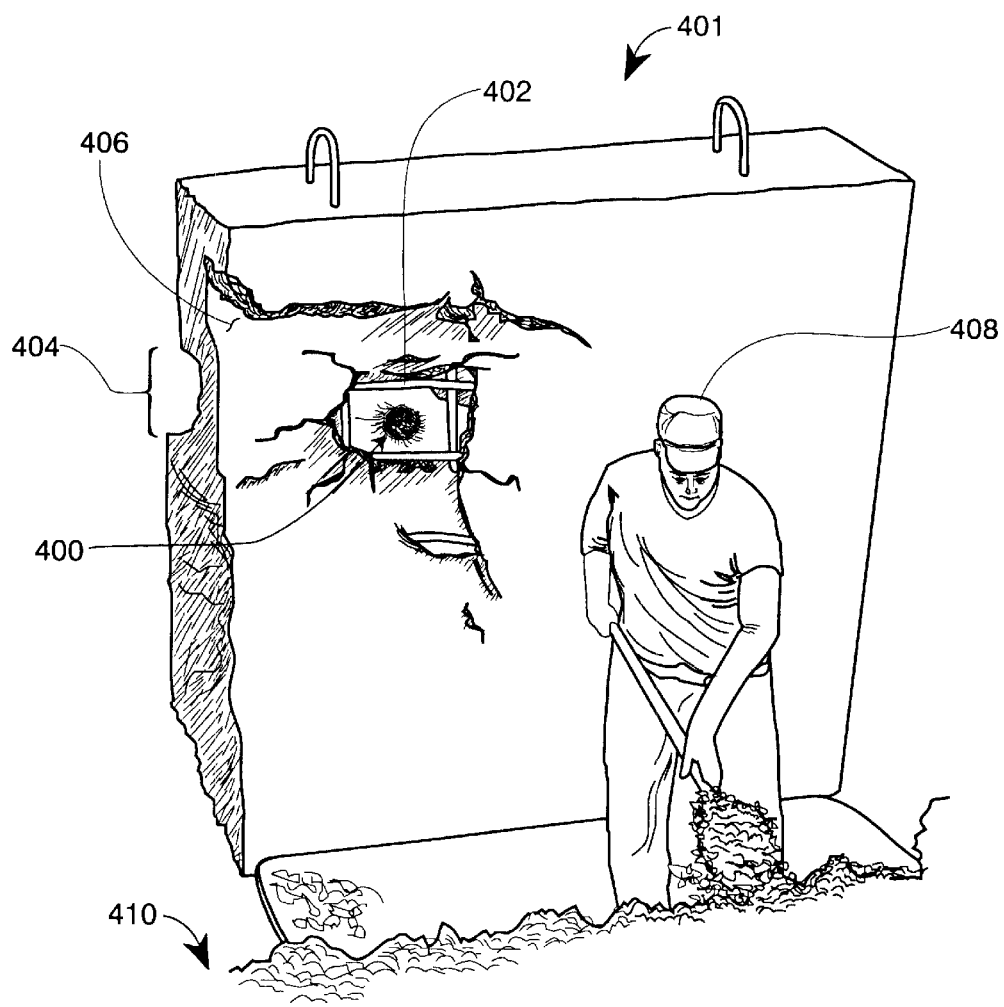
FIG. 4 shows a quick present invention-assisted post-test recovery operation performed following a FIG. 1 cannon shot, a recovery replacing front end loader excavation.

FIG. 4 in the drawings is briefly described earlier herein and shows a draftsman's rendition of photographs representing a typical earth-involved recovery environment for a projectile and its locator beacon according to the present invention. The concrete target 401 shown in the FIG. 4 drawing has been penetrated at 400 by a projectile of the FIG. 2 type, i.e., the projectile represented at 110 in FIG. 1. During this penetration the target incurred the frontal and rear side spalling fractures indicated at 404 and 406 and the reinforcing bar damage shown at 402 while the projectile and present invention beacon incurred impact deceleration and shock wave propagation through the projectile from its point of impact. The FIG. 4 projectile has also of course incurred an initial period of large acceleration force during the time of launching from a cannon or other apparatus: however in most instances these launch acceleration forces are of lesser magnitude than impact deceleration forces and are not considered paramount with respect to the present invention. The present invention may be arranged to have favored tolerance for either acceleration or deceleration forces if needed however.

A shock wave propagating along the lengthwise axis of a projectile such as the projectile 200 is believed to be reasonably characterized by the mathematical impulse function when the shock wave originates in an abrupt event such as a target impact; this shock wave propagates from front to back of the projectile. The characterization of the shock wave according to the mathematical impulse function is helpful for understanding purposes as well as being analytically convenient in view of the extensive consideration of this function in classical mathematics texts. With respect to the present invention beacon the wide frequency spectrum description of this impulse function may be advantageously considered to include.both high frequency components and low frequency components, components separately considered in protecting the beacon apparatus from impact damage. The ceramic package containing the disclosed HX1003 radio frequency energy generating integrated circuit chip is for example found to be especially susceptible to impact damage, particularly to the higher of these impulse function-related frequency components.

At 738 in the FIG. 7 drawing is represented the outline of the molded housing 300 for enclosing the locator beacon electronics at the rear of a projectile, the housing as first appears in the FIG. 3 drawing. The relationships between the housing 738, the forward direction of the projectile and the projectile travel direction are indicated by the arrow 736 in FIG. 7; the orthogonal disposition of the electronic components with respect to the projectile travel direction is also apparent from this drawing. Surrounding the electronic circuit elements in the FIG. 7 drawing is a circumferentially closed tubular protection member 704 providing isolation of these components from higher frequency portions of the target impact-generated shock wave. This tubular protection member may have an inside diameter of about one half inch and an outside diameter of about 0.7 inch as indicated at 734 in FIG. 7. The action of this tubular protection member 704 is to convey or conduct higher frequency shock wave components around the enclosed electronic circuit elements rather than allow shock wave interaction with the electronic circuit elements, particularly the ceramic package at 700.

The tubular protection member 704 in FIG. 7 may be made of G-10 fiberglass-reinforced plastic material as is available from The Mc Master Carr Company and may have either a 0.7 inch or a 1.2 inch length depending on whether the battery 708 is contained within the tubular protection member 704 or in another location. Preferably any empty or void spaces within the tubular protection member 704, spaces such as are indicated at 728 and 730 in FIG. 7, are filled with a potting or casting material to add both wiring support and strength/rigidity to the overall FIG. 7 assembly.

A material such as Emerson Cumming Stycast 1090® (Emerson Cumming is a division of National Starch and Chemical Limited of Windsor Court, Kingswood Business Park, London Road, High Wycombe, Bucks, England and is represented in the U.S. by Ideal Instrument Company, 863 Washington Street, Canton, Mass. 02021-2513) or the Hardman 4001 epoxy resins available from Elementis Specialties Performance Polymers of 600 Cortland Street, Belleville, N.J. may be used for this filling purpose and is preferably disposed in a void-free manner. Similar filling may be used in open spaces surrounding the tubular protection member 704, the spaces indicated at 729 in FIG. 7 for example.

At 716 in the FIG. 7 drawing there is represented a contoured strip of conductive metal such as copper serving the purpose of conveying the output of the radio frequency circuit package 700 from a pin 4 node on the lower face of the package around the edge and to the upper surface of the package where the antenna 710 is attached at the node 732. Similar conductors each isolated from the other are preferred for connecting to the power and output-enable signal nodes of the package 700 notwithstanding the presence of the metal protection layer 720. The antenna 710 connects with the first of these conductors 716 at 732. The antenna 710 is made to have an electrical length of one-quarter wavelength while surrounded by the polyurethane material of the housing 738 in the manner described in the above-identified Ser. No. 09/832,453, patent document. The antenna 710 preferably consists of a solid 20 AWG copper conductor wound around for example a three eights inch diameter form and disposed in a rearmost part of the housing 738 (as mounted on the projectile) either during housing molding or by drilling and plugging the housing 738 end wall after its molding. A ground connection (i.e., the wire 750, 850 and 950 described subsequently herein) is brought out from the tube 704 in either FIG. 7 or FIG. 8. At 712 and 714 in FIG. 7 are shown a pair of leads connecting the battery 708 with the electronics board 706; these leads are also physically supported by the above identified filling material of spaces 728 and 730. The retaining annular ring 740 capturing the housing 738 in FIG. 7 within a projectile body is of the threaded periphery type as shown in segregated form at 206 in FIG. 2 and discussed in connection with FIG. 2 and FIG. 6 herein.

When the components or elements of the present invention beacon apparatus are disposed in the manner shown in FIG. 7 the shock wave resulting from projectile 110 impact with a target travels along the vertical axis of the FIG. 7 drawing and thereby arrives at the electronic elements and the battery 708 (actually at the tubular member protecting these elements) in substantial coincidence. In the preceding and following paragraphs the FIG. 7 and FIG. 8 descriptions involving this shock wave are somewhat intertwined however similar drawing numbers differing only by their 700 or 800 highest order digit are used to clarify the two different descriptions and to also relate similar parts appearing in the two drawings.

Both FIG. 7 and FIG. 8 in the drawings therefore show physical arrangements for protecting the beacon transmitter electronic components from impact and shock wave damage. In the FIG. 7 drawing these beacon electronic components are shown disposed along an orthogonal direction with respect to a longitudinal axis of the projectile 200 while in FIG. 8 the electronic components are stacked along the longitudinal axis while remaining orthogonal to the shock wave. Each of these dispositions has been found to provide component tolerance of deceleration forces in the 20,000 G range and is therefore believed to be successfully usable as is otherwise dictated by projectile size and shape considerations. Cut-away lines 722, 742, 822 and 842 in FIG. 7 and FIG. 8 respectively show interior parts of the FIG. 7 and FIG. 8 arrangements of the invention.

In the FIG. 8 showing of the invention the deceleration shockwave from encountering a hardened target proceeds from the forward-most wide flange 843 end of the FIG. 8 housing 838 to the tapered section housing the antenna. In the FIG. 8 stack of electronic components, the following forward to aft order of component stacking within the protective tube 844 is preferred in response to this shockwave.

1. The stainless steel case of the 3 volt DL1/3 lithium battery 808 is disposed lowest in the stack and is the first to see the shockwave.

2. A double copper clad FR-4 material circuit board 806 with a non-component side or empty side touching the aft side of battery 808 is next in the stack. The top or aft side of the circuit board 806 holds the CD4060 CMOS counter-oscillator circuit chip 802 which is located below the ceramic HX1003 circuit package 800 in the FIG. 8 view and therefore does not appear in the FIG. 8 drawing. This disposition may be understood from the exploded partial view of chip 702 and other components shown in the FIG. 7A drawing.

3. A type 1095 steel flame hardened hack-saw blade segment shock mitigator 820 is placed on top of or aft of the CD4060 chip 802 in FIG. 8. The blade segment is supported by the Stycast 1095 potting compound described both above and below; this compound fills spaces between the circuit board 808 and the HX1003 circuit package 800 and indeed fills the voids within the FIG. 8 fiberglass tube 810. The 1095 steel has a hard surface that deflects high frequency shock components and a carbon-steel internal grain structure that is a poor conductor of lower frequency sound. This special steel and the thus-far ordering of components in the FIG. 8 stack are desirable to protect the overlying HX1003 ceramic transmitter chip 800.

4. A layer of Kapton® polymerized plastic film insulating tape prevents the hack-saw blade segment or steel shock mitigator 820 from shorting the HX1003 ceramic transmitter chip 800 terminals which are located on the lower surface of the transmitter chip 800 housing. The transmitter connections are brought around to the sides and top of the chip with copper foil strips for access as shown at 812 and 814 however connections to these copper foil strips are omitted for drawing clarity.

5. A spiral wound ⅜ inch diameter antenna 804 is attached to the antenna terminal copper foil stripe 814. The antenna is electrically a quarter wave long when dielectrically lengthened by the surrounding Monothane resin of the housing 838 and an overlying representative bag of clay sand. (The greatest antenna efficiency is needed when the antenna is buried in the backstop or down range soil as may be appreciated from the mission of FIG. 7 and FIG. 8 devices and as is explained in the above identified Ser. No. 09/832,453, filed Apr. 12, 2001, now U.S. Pat. No. 6,380, 906.

Referring again to the FIG. 7 drawing, the battery 724 in this arrangement of the invention is disposed on its side adjacent to the FR-4 material electronics board 706 and the HX 1003 ceramic transmitter module 700. With exception of the battery 724, the stacking order and orientation of components with respect to the fore-aft shock wave is the same in FIG. 7 as was described for FIG. 8; ie . the FR-4 board components are followed by the steel hack-saw blade segment shock mitigator or steel deflector/diffuser 720, the Kapton polyimide plastic tape 718 and the copper foil antenna connection 716. The FR-4 board 706 is square in FIG. 7 in contrast with the round shape in FIG. 8. The board 706 is made to be a tight fit in the tube 744 diameter. The lower half of the tube 744 is usable for electrical connections and the remaining voids are filled with Sytcast 1095 or Hardman 1004 epoxy. The break wire 750 in FIG. 7 (950 in FIG. 9) is brought out of the body 738 just above the locking ring 740 as it seats on the flange 743.

Possible variations for the composition of the 1095 steel shock mitigators 720 and 820 in FIG. 7 and FIG. 8 are KOVAR® or INVAR® steel alloys which also display the properties of surface hardness found useful to deflect high frequency shock components as well as providing low speed internal propagation of sound energy. The sound propagation characteristics of these materials are in fact less than those of the 1095 steel. Other arrangements of the FIG. 7 and FIG. 8 embodiments of the invention may dispose a protective assembly of steel layers on each side of the ceramic package of the radio frequency energy generator chips 700 and 800. Such arrangements may be useful for example in the FIG. 8 axial disposition arrangement of the invention under more extreme conditions.

FIG. 9 in the drawings shows a preferred electrical schematic diagram for the locator beacon of the present invention. In the FIG. 9 schematic diagram the HX 1003 radio frequency energy generator circuit chips 700 and 800 appear in electrical schematic form at 902 and a modulation circuit such as a CD 4060 CMOS clock counter circuit appears at 900. These integrated circuit devices are available respectively from RF Monolithics, Incorporated of Dallas, Tex. and from National Semiconductor Corporation of Santa Clara, Calif. In FIG. 9 these integrated circuit devices are energized by the battery 904 which represents the batteries 708 and 808 in FIG. 7 and FIG. 8. The integrated circuit devices 900 and 902 provide a switched or keyed carrier output signal to the antenna represented at 922. In view of a need for minimum mass and space usage in the munitions projectile environment of the invention, the apparatus in the FIG. 9 schematic diagram is arranged to have the lowest possible component mass and part count, the smallest component physical sizes and the lowest energy requirements deemed practical as is described subsequently herein.

Additional components appearing in the FIG. 9 schematic diagram include the RC network appendage to the CD 4060 CMOS clock counter circuit 900 as appears at 910, 912 and 914 and the two discrete transistors 916 and 918 connecting with the clock counter circuit output signal ports. These NPN junction transistors include the integral base resistors 926 and 927 (and thereby enable a direct connection with the output pins of the 4060 circuit without additional component space or mass) and may be embodied as transistors of the Panasonic UN5210 type. A current limiting resistor 920, of for example fifteen kilo ohms value, is employed at one signal output node of the CD 4060 clock counter in order that each of the illustrated counter output nodes may cause the combined signal node 930 to become grounded during reset and thereby inactivate the enable input port of the HX 1003 radio frequency signal generator for certain time intervals as is explained below. Two of these deactivations occur by way of conduction in the transistors 916 and 918. A deactivation of the entire FIG. 9 circuit as described below may be used to hold the apparatus in readiness for operation during storage intervals.

The usual configuration of the FIG. 9 circuit in a test projectile is to have the battery 904 connected permanently once the test apparatus is assembled. For this purpose the FIG. 9 apparatus allows all circuits to be placed in their stand-by/off states by pulling the reset pin, pin 12, of the CD4060 circuit high or up to the positive level of battery 904. This is described in greater detail below. When launching breaks the wire 750, 850, 950, the pin 12 reset terminal goes low-false and the counter outputs will rise and turn on the HX1003 transmitter. This turn-on results in a ⅛ duty cycle modulation pattern as is described below herein.

During operation of the circuit described by the FIG. 9 schematic diagram the clock portion of the CD 4060 clock counter circuit 900 is caused to operate at a clock frequency in the range of one to two kilohertz by selecting appropriate values for the RC network at 910, 912 and 914. Values such as 10 picofarads, 1.5 megohms and 3.3 megohms respectively for example provide this clock frequency and ultimately result in an audible and distinctive "beep-beep-rest" modulation audio signal with a 1 kilohertz voice being produced by the radio frequency signal output from the beacon.

This modulation signal also causes a one eighth time or 12.5 percent duty cycle in the FIG. 9 circuits and hence enables a reduced battery size requirement at 904 in the FIG. 9 diagram. This is because the electrical circuit shown in FIG. 9 performs an "ON" and "OFF" or keyed modulation of the radio frequency energy generator circuit 902 in lieu of amplitude modulation or some other form of continuous radio frequency carrier presence modulation. This low duty cycle and the keyed modulation arrangement are believed to be especially desirable for present beacon use because of the limited battery size and mass thus enabled. The energy efficient switched or key modulated radio frequency signal generates slightly wider sideband frequencies in the radio frequency output of the FIG. 9 apparatus than does other modulation arrangements, a factor which may be of concern in some uses of the invention. This attribute of the FIG. 9 circuits may be reduced with use of a RC network on the modulation line to slow the modulation rise time. Clearly other low duty cycle modulation arrangements of this nature and of perhaps even better energy conservation capability can be tapped from the CD4060 counter outputs or otherwise arranged.

The battery shown at 904 in the FIG. 9 schematic diagram may be of differing types that are primarily selected for being capable of surviving the described projectile acceleration and deceleration forces while also providing desirable energy to mass and energy to size ratios. In particular batteries of the lithium, alkaline, mercury, silver oxide and thermal battery types have proven successful in present invention use especially when selected or modified to have high G-force immunity. A specific battery from this group found to be desirable is the Duracell® DL1/3N, a 160 milliampere-hour lithium battery: this is in fact the battery represented at 306 in the FIG. 3 drawing. Battery orientation with the positive terminal closest to the projectile front is preferred to withstand for the deceleration force. Other battery locations outside the tubular protection member 704 are also possible. When operated at a radio frequency power level of 1-milliwatt an operating life of over six days and 16 hours is achievable with the DL1/3N battery and the described modulation arrangement.

At 946, 948 and 950 in the FIG. 9 schematic diagram there is shown a resistor pair and loop wire combination usable to transition the entire FIG. 9 circuit apparatus between "OFF" and "ON" or standby and active modes of operation and moreover to accomplish this change of operating mode automatically upon launching of the FIG. 1 projectile from the howitzer or other launching apparatus. These components operate by way of the pin 12 reset input node of the CD 4060 CMOS clock counter circuit 900 and serve in the FIG. 9 illustrated condition to hold this reset input node in a high or logically active condition. With such a pin 12 input high condition the output signal from each of the CD 4060 CMOS clock counter circuit output nodes 1, 3 and 7 is in a low voltage or logically inactive condition and both the node 930 and the disable input at pin 1 of the HX 1003 transmitter circuit chip 930 are also in this low condition. With a low disable node input the transmitter circuit chip 930 is also held in an inactive condition where it emits no radio frequency energy from the pin 4 output node and most significantly thus consumes a few microwatts of battery 904 energy. By holding the pin 12 input of the CD 4060 CMOS clock counter circuit in this high state therefore the entire FIG. 9 circuit is maintained in a 20 microwatt energy consumption state suitable for a pre launch condition or for at least short term storage of the locator beacon apparatus.

During howitzer launch of the projectile 110 and the attached beacon apparatus the loop of typically 28 gauge copper wire 950 in FIG. 9, the loop corresponding to the wire loops 750 and 850 in the FIG. 7 and FIG. 8 drawings, is interrupted by the motions and thermal displays of the launch event. With this interruption the logical status of the CD 4060 CMOS clock counter circuit pin 12 and the HX 1003 transmitter circuit chip 930 pin 1 inputs are made true so that both circuit chips become active and the desired modulated radio frequency energy signal is generated. A low-true open circuit level of the CD 4060 CMOS clock counter circuit pin 12 input is assured by the resistor 946, which is of about 330 kilo ohms value, pulling the pin 12 input down to ground when current flow from the battery 904 and the resistor 948 (of about 100 kilo ohms value) is removed from pin 12 by loop 950 interruption. Since the CD 4060 CMOS clock counter circuit is of the low energy consumption CMOS type and the transmitter chip 902 is specified to require little current in its disabled state the greatest energy consumption occurring during operation of the FIG. 9 circuit apparatus probably occurs in the series connected resistors 946 and 948. With the stated values of these resistors and a 3 volt 160 milliamp-hour battery at 904 this disabled or standby current is of about 7 microamperes magnitude and would therefore consume 10 percent of the specified battery 904 life in 2.3 thousand hours or 100 days.

A receiver for the signals emitted by the described beacon/transmitter is shown in physical form at 500 in FIG. 5 of the drawings and is represented at 940 in the FIG. 9 schematic diagram. This receiver is preferably disposed in a battery energized hand-cartable small package arrangement usable under portable conditions by range personnel under conditions such as suggested by the FIG. 1 and FIG. 4 drawings. In the FIG. 9 diagram the receiver 940 is represented to convert radio frequency signals intercepted by the antenna 946 into audio sounds 944 emitted from a transducer device or loudspeaker disposed at 942 on the receiver housing. Although this receiver may be of many conventional types, a receiver capable of efficiently converting a keyed or pulse modulated radio frequency carrier to an audio frequency tone or of generating some visual or audible or manifestation of having received the described signals is desired. A receiver of the amplifier sequenced hybrid or ASH type offers significant advantages for this use. Such receivers are also available, in the form of a major components kit or in other form, from RF Monolithics Incorporated of Dallas, Tex. Advantages in the nature of sensitivity, large dynamic range, small size and overall simplicity are often attributed to such receivers. A loudspeaker and associated amplifier are preferably added to an RF Monolithics RX1300 receiver circuit chip to comprise the receiver 940.

By way of supplementing and summarizing the thus far recited disclosure of the present invention while using concise other words and an altered description viewpoint it may be appreciated that the invention is concerned with shock hardening a ceramic radio frequency transmitter chip commercial product. To accomplish this a leading shape and a steel shield are used to protect the transmitter chip. Shock hardening the system also involves reducing system mass and battery requirements. This in turn is assisted by the reduced duty cycle on-off keyed amplitude modulation (AM) arrangement used and by minimizing the AM tone modulator components.

To be more specific, unlike a classic 100% AM tone transmitter playing continuous modulation power against carrier power (often by varying the potential applied to some transmitter amplifier stage and frequently by using power consuming class A linear amplifier stages following a low level modulator) the present invention modulation is "ON-OFF keyed" at the tone rate. It is thus a function of the tone modulator to minimize battery mass by placing the transmitter in its standby or sleep mode for half of the tone rate and at least half of all time. In practice, three digital counter outputs are used to disable (i.e., modulate) the transmitter carrier so that the 50% duty cycle of the tone is curtailed by 50% over time. Another output signal twice as fast as the 50% cycle time, also curtails the tone, giving a distinctive "beep-beep-quiet" signature to the modulated radio frequency signal while limiting power consumption to one eighth of the continuous transmitter requirement. It is also disclosed that when the counter is held in a reset mode using an external enabling break-wire loop, all of these counter signals combine to present a logic low state to the transmitter RF module. This places the transmitter in a low power standby mode. The quiescent counter current is less than 12 micro amperes while the off state current for the transmitter is about one micro ampere. Thus stand by power and off power between emitted signal "beeps" is about 60 microwatts.

Testing experience has shown the ceramic transmitter is the component of the beacon most susceptible to failure during impact, followed by soft alkaline battery cells. Protection of the transmitter component is herein achieved with use of a tubular reinforced plastic body having its axis either normal to or parallel with the impact force in order to redirect some of the shock wave away from the electronics within the tube. After the shock wave is deflected by the tubular shape, metal sheet applied to the ceramic microcircuit base has sufficient surface hardness to deflect high frequency shock and provides internal diffusive qualities to attenuate lower frequencies. In practice, the type 1095 steel from a hacksaw blade has demonstrated surface hardness and a spherical carbon-iron molecular matrix that mitigates sound. KOVAR, a Cobalt steel alloy and Invar 36, a Nickel alloy steel, are believed to be feasible similar ceramic chip protector materials. A 0.022-inch thick piece of steel is therefore attached to the bottom or bottom and top faces of the ceramic circuit package using a thin void-less coat of hot glue. Shielding more sides may help conquer inertial shocks above 22 k-G. The metal blade piece may be insulated to prevent shorting connections. Electrical connections to the circuit package are made from the ceramic base with copper foil rather than by conventional mounting to a circuit board. The base of the ceramic module is made normal to the axis of impact to realize the benefit of mitigation by shape and sheet material as discussed. If batteries, tone board, and RF chip are stacked along the axis of impact, this order from the impact face is maintained to shadow the ceramic RF chip. It is found to be desirable to place the heaviest piece of the stack nearest the impact face and the ceramic RF module with antenna in a rearward location.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. The method of protecting a projectile warhead-carried integrated circuit chip and a connected integrated circuit chip energy source from warhead deceleration force-related physical damage comprising the steps of:

disposing said integrated circuit chip and said integrated circuit chip energy source as adjacent components of a module;

locating said adjacent components module in an orthogonally aligned orientation with respect to the major axis of deceleration force incidence expected for said warhead;

said integrated circuit chip energy source being, in said axially aligned orientation, disposed in an integrated circuit chip crush-retarding, selected location behind said integrated circuit chip in response to expected warhead deceleration force;

additionally protecting said integrated circuit chip from high frequency components of said deceleration force incurrence with an attached layer of insulating material and overlying layer of shock wave energy-controlling metal;

isolating said integrated circuit chip and said integrated circuit chip energy source inclusive module from low frequency components of said acceleration and deceleration force incurrence with a surrounding tubular enclosure of resin-fiberglass material;

occupying void spaces within and surrounding said tubular enclosure with a sound dampening epoxy and glass bead filler material.

2. The method of protecting a warhead-carried integrated circuit chip and a connected integrated circuit chip energy source from deceleration force-related physical damage of claim 1 wherein said integrated circuit chip comprises a radio frequency energy generating electrical circuit of selected output frequency characteristic and further including the steps of:

limiting physical size and mass requirements in a an electrical battery comprising said connected integrated circuit chip energy source by energizing said radio frequency energy generating electrical circuit in a switching duty cycle modulation fraction of less than one-half; and controlling said switching duty cycle fraction using a temporal switching modulation circuit chip received in said module.

3. The method of protecting a warhead-carried integrated circuit chip and a connected integrated circuit chip energy source from deceleration force-related physical damage of claim 2 wherein:

said selected radio frequency is a ultra high radio frequency between four hundred and four hundred fifty megahertz;

said switching duty cycle modulation comprises less than twenty five percent of radio frequency carrier energized time and generates a characteristic audio sound modulation pattern.

4. The method of protecting a warhead-carried integrated circuit chip and a connected integrated circuit chip energy source from deceleration force-related physical damage of claim 1 wherein:

said module is disposed in a rear extremity location of said warhead in axially aligned orientation with an axis of acceleration and deceleration force incidence of said warhead;

said integrated circuit chip energy source is disposed ahead of said integrated circuit chip along said axis of deceleration force incidence of said warhead in a position of first incurring a shock wave traveling along a direction of said an axis deceleration force incidence from a warhead impact with a fixed object.

5. The method of protecting a warhead-carried integrated circuit chip and a connected integrated circuit chip energy source from acceleration and deceleration forces-related physical damage of claim 1 wherein said step of additionally protecting said integrated circuit chip from high frequency components of said acceleration and deceleration force incurrence with an attached layer of insulating material and overlying layer of shock wave energy-controlling metal further includes the steps of:

covering a mounting surface of said integrated circuit chip with an adhered insulating layer of polyimide plastic film;

overlaying said layer of polyimide plastic film with an adhered layer of high frequency shock wave energy-deflecting high carbon steel of greater or lesser thickness than a container package portion of said integrated circuit chip.

6. The method of protecting a warhead-carried integrated circuit chip and a connected integrated circuit chip energy source from acceleration and deceleration forces-related physical damage of claim 1 wherein:

said surrounding tubular enclosure material is reinforced with resin-fiberglass; and said void spaces-occupying organic filler material is an epoxy resin and filler material.

7. The method of protecting a warhead-carried integrated circuit chip and a connected integrated circuit chip energy source from acceleration and deceleration forces-related physical damage of claim 1 wherein said step of locating said module adjacent components in an orthogonally aligned orientation with respect to an axis of acceleration and deceleration force incidence expected for said warhead includes the steps of:

covering a mounting surface of said integrated circuit chip with an insulating layer of polyimide plastic film;

overlaying said layer of polyimide plastic film with a layer of high frequency shock wave energy-deflecting high carbon steel of greater or lesser thickness than a container package portion of said integrated circuit chip;

disposing said integrated circuit chip and said integrated circuit chip energy source at right angle to said axis of acceleration and deceleration force with said layer of high frequency shock wave energy-deflecting high carbon steel located to first incur a shock wave traveling along an axis of said velocity vector from a warhead impact with a fixed object.

8. Spent test-munitions projectile retrieval, high G force resistant low energy requirement locator beacon apparatus comprising the combination of:

a selectively configured resin polymer material housing disposable in a rear location of said test-munitions projectile prior to projectile airborne launch;

an integrated circuit chip assembly received in said selectively configured organic material housing and having a radio frequency energy generating integrated circuit chip with an insulating material layer and an overlying selectively energy absorbing metallic layer covering attached on one face thereof;

said integrated circuit assembly further including a radio frequency energy generating chip-keying modulator circuit of selected distinctive audio frequency keying pattern and less than fifty percent radio frequency energy generating integrated circuit chip output duty cycle characteristics;

a source of electrical energy of said duty cycle and selected audio frequency keying pattern-enabling limited size and mass connected with said keying modulator circuit and said radio frequency energy generating chip;

a tubular enclosure member surrounding said integrated circuit assembly and disposed within said elastic urethane material housing along one axis thereof;

a radio frequency antenna member disposed within an axial extremity portion of said elastic urethane material housing and connected with a radio frequency energy output port of said integrated circuit assembly;

a portable radio frequency energy receiver, hand cartable to a selected search vicinity location for said spent test-munitions projectile.

9. The spent test-munitions projectile retrieval, high G force resistant low energy requirement locator beacon apparatus of claim 8 wherein said selectively configured resin polymer material housing disposable in a rear location of said test-munitions projectile is comprised of an elastic polyurethane material and includes an internal cavity receptacle for said integrated circuit chip assembly, said surrounding tubular enclosure member and said source of electrical energy.

10. The spent test-munitions projectile retrieval, high G force resistant low energy requirement locator beacon apparatus of claim 8 wherein said radio frequency energy generating integrated circuit chip is characterized by a carrier output frequency of four hundred to four hundred fifty megahertz.

11. The spent test-munitions projectile retrieval, high G force resistant low energy requirement locator beacon apparatus of claim 8 wherein said keying modulator circuit is connected with an output enable input of said radio frequency energy generating integrated circuit and is characterized by an enabled output from said radio frequency energy generating integrated circuit of less than twenty five percent radio frequency carrier ON time.

12. The spent test-munitions projectile retrieval, high G force resistant low energy requirement locator beacon apparatus of claim 11 wherein said keying modulator circuit is characterized by an output from said radio frequency energy generating integrated circuit comprising a tone voiced repeating beep-beep-rest pattern.

13. The spent test-munitions projectile retrieval, high G force resistant low energy requirement locator beacon apparatus of claim 11 wherein said keying modulator circuit includes an RC oscillator circuit and a counter's divided output decoding circuit.

14. The spent test-munitions projectile retrieval, high G force resistant low energy requirement locator beacon apparatus of claim 8 wherein said tubular enclosure member surrounding said integrated circuit assembly and disposed within said resin polymer material housing along one axis thereof is disposed along one of a lengthwise axis, and a crosswise axis of said test-munitions projectile.

15. The spent test-munitions projectile retrieval, high G force resistant low energy requirement locator beacon apparatus of claim 14 wherein said source of electrical energy of limited size and mass comprises an electrical battery also enclosed within said tubular enclosure member.

16. The spent test-munitions projectile retrieval, high G force resistant low energy requirement locator beacon apparatus of claim 15 wherein said tubular enclosure member surrounding said integrated circuit assembly and disposed within said organic material housing along one axis thereof is disposed along a lengthwise axis of said test-munitions projectile and said battery is disposed at a forward-most end of said tubular member.

17. The spent test-munitions projectile retrieval, high G force resistant low energy requirement locator beacon apparatus of claim 14 wherein said tubular enclosure member is comprised of reinforcing fiberglass and includes a void space-filling epoxy and glass bead material.

18. The spent test-munitions projectile retrieval, high G force resistant low energy requirement locator beacon apparatus of claim 8 wherein said portable radio frequency energy receiver is an amplifier-sequenced hybrid disposed receiver operating at a radio frequency between four hundred and four hundred fifty megahertz.

19. The spent test-munitions projectile retrieval, high G force resistant low energy requirement locator beacon apparatus of claim 8 further including an annular shaped threaded member surrounding a flange base portion of said selectively configured elastic urethane resin material housing at said rear location of said test-munitions projectile and mating with internal threads located in said projectile.

20. The limited payload-penalty method of locating an obscured spent munitions warhead in a large target area of energy dissipating media, said method comprising the steps of:

disposing an electrical energy-optimized shock hardened radio frequency signal emitter electrical circuit apparatus on said warhead during an assembly operation;

initiating functional operation of said electrical energy optimized shock hardened radio frequency emitter electrical circuit prior to termination of a kinetic energy propelled operational phase and obscuring of said munitions warhead;

modulating a radio frequency energy signal output of said radio frequency emitter electrical circuit apparatus in a selected audio tone voiced, recognizable, electrical energy conserving, temporal duty cycle, switching pattern, of short radio frequency energy emission ON time and greater radio frequency energy emission OFF time;

selecting limited physical size, weight and quantity of energy-producing reactants for a warhead-carried electrical battery energizing said radio frequency signal emitter electrical circuit apparatus in measured response to said selected audio tone-recognizable, electrical energy conserving, temporal duty cycle, switched pattern, of short radio frequency energy emission ON time and greater radio frequency energy emission OFF time and in response to a selected time duration for radio frequency energy emission enabled obscured or buried warhead-locating search.

* * * * *